United States Patent
Hagimori

[19]

[11] Patent Number: 5,978,151
[45] Date of Patent: Nov. 2, 1999

[54] OPTICAL SYSTEM AND ASSEMBLING METHOD OF OPTICAL SYSTEM

[75] Inventor: Hitoshi Hagimori, Ikoma, Japan

[73] Assignee: Minolta Co., Ltd., Osaka, Japan

[21] Appl. No.: 09/152,277

[22] Filed: Sep. 14, 1998

[30] Foreign Application Priority Data

Sep. 12, 1997 [JP] Japan .................................. 9-248119

[51] Int. Cl.$^6$ .............................. G02B 15/14; G02B 7/02; G02B 27/64; G01B 11/00
[52] U.S. Cl. ........................ 359/683; 359/676; 359/822; 359/557; 396/55; 356/359
[58] Field of Search .................................. 359/676, 683, 359/822, 557; 396/55; 356/359

[56] References Cited

U.S. PATENT DOCUMENTS

| | | | |
|---|---|---|---|
| 4,747,677 | 5/1988 | Horikawa et al. ...................... | 359/759 |
| 5,453,606 | 9/1995 | Hojo ..................................... | 250/201.1 |
| 5,698,841 | 12/1997 | Momoki ............................... | 350/201.2 |

OTHER PUBLICATIONS

Ray, Sidney F., "Applied Photographic Optics," Focal Press: Linacre House, Jordan Hill, Oxford, England, chapter 11(pp. 77–92), 1994.

*Primary Examiner*—Georgia Epps
*Assistant Examiner*—Evelyn A. Lester
*Attorney, Agent, or Firm*—Burns, Doane, Swecker & Mathis, LLP

[57] ABSTRACT

An optical system has a plurality of lens elements and a lens block including a single lens or multiple lenses included in the plurality of lens elements, wherein an extent of curvature of field asymmetricity in two or more directions is detected by an off-axial rays that have passed through a lens block constituting one or more lens elements in the optical system and wherein a position of the lens block is adjusted such that the curvature of field asymmetricity is reduced to a minimum, wherein the lens block fulfills the predetermined conditions.

11 Claims, 2 Drawing Sheets

OPTICAL SYSTEM AND ASSEMBLING METHOD OF OPTICAL SYSTEM

This application is based on the application No. 9-248119 filed in Japan, the content of which is hereby incorporated by reference.

BACKGROUND OF THE INVENTION

1. Field of the Invention

The present invention pertains to, among optical systems in cameras, etc., compact optical systems that have a high decentering error sensitivity and that require assembly in which lens positions are adjusted.

2. Description of the Related Art

Conventionally, assembly of a lens into a lens holder has generally been performed by inserting the lens into a lens holder having an inner diameter equal to or slightly larger than an outer diameter of the lens, tightening the holder around the lens and fixing the assembly using a spring washer or an adhesive. While this method allows easy assembly and inexpensive processing of the components, it has the problem that the lens easily becomes decentered relative to the optical axis and the lens therefore cannot be precisely maintained in the correct position. If the lens becomes decentered relative to the optical axis, decentering aberrations such as axial coma and curvature of field asymmetricity occur due to errors resulting from the decentering, and consequently the conventional assembly of a lens into a lens holder has been a major cause of deterioration in optical performance.

Meanwhile, in optical systems having a high error sensitivity for axial coma, a lens position adjustment device having a lens position adjusting means has been developed that detects the axial coma from the light that has passed through the optical system and adjusts the position of one lens such that the axial coma is reduced to the minimum, and lenses and lens holders have been assembled using this device. This device has played the role of reducing the axial coma of one lens block in the entire optical system to the minimum by adjusting the relative position of a certain lens. (U.S. Pat. No. 5,453,606).

However, in the trend toward increasingly small optical systems witnessed in recent years, the decentering error sensitivity has been increasing not only in one lens block but also between lens blocks, and the problem has arisen that, due to significant decentering aberrations, the desired optical performance cannot be attained simply by assembling the lens blocks without any further adjustment. In addition, in the past, the curvature of field asymmetricity could be reduced to a certain extent in many optical systems by eliminating the axial coma, but currently an increasing percentage of optical systems have an error sensitivity characteristic such that the curvature of field asymmetricity remains even if the axial coma is eliminated.

In other words, because the decentering error sensitivity of each lens block has increased due to the reduction in size of optical systems, the desired performance cannot be achieved using the conventional assembly method, and resolution of this problem is seen as a major issue.

SUMMARY OF THE INVENTION

The object of the present invention is to provide an improved optical system.

Another object of the present invention is to provide an optical system in which the desired optical performance is achieved.

Yet another object of the present invention is to provide an optical system using which the desired performance cannot be achieved with the conventional assembly method but that can be assembled using a lens position adjustment method in order to achieve said performance.

These objects are attained by a construction for a zoom lens system in an optical system comprising multiple lenses, in which (1) the extent of curvature of field asymmetricity is detected regarding the off-axial light traveling in two or more directions from among the light rays that have passed through a part or all of said optical system (2) the position of a lens block in the optical system comprising a single lens or multiple lenses is adjusted using a position adjusting means such that the curvature of field asymmetricity may be reduced to a minimum, and (3) the position-adjusted lens block is fixed prior to assembly, wherein the position-adjusted lens block moves independently of its neighboring lens blocks during zooming.

These objects are also attained by a construction for a zoom lens system in an optical system comprising multiple lenses, in which (1) the extent of axial coma is detected regarding the axial light from among the light rays that have passed through a part or all of said optical system, (2) the position of a lens block in the optical system comprising a single lens or multiple lenses is adjusted using a position adjusting means such that the axial coma may be reduced to a minimum, and (3) the position-adjusted lens block is fixed prior to assembly, wherein the position-adjusted lens block moves independently of its neighboring lens blocks during zooming.

The invention itself, together with further objects and attendant advantages, will be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
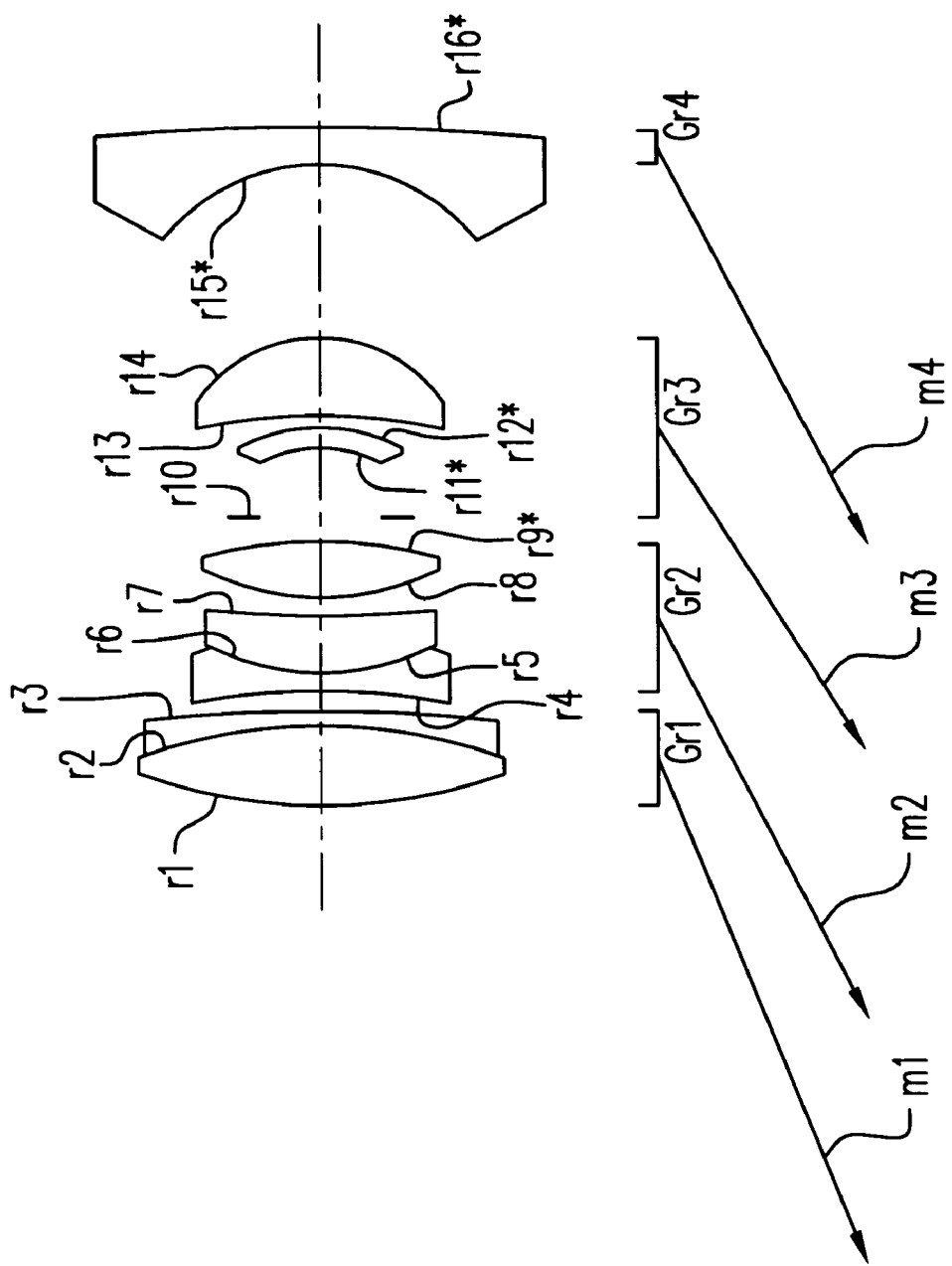
FIG. 1 is a drawing showing the lens construction of an optical system pertaining to a first embodiment.
Figure 2:
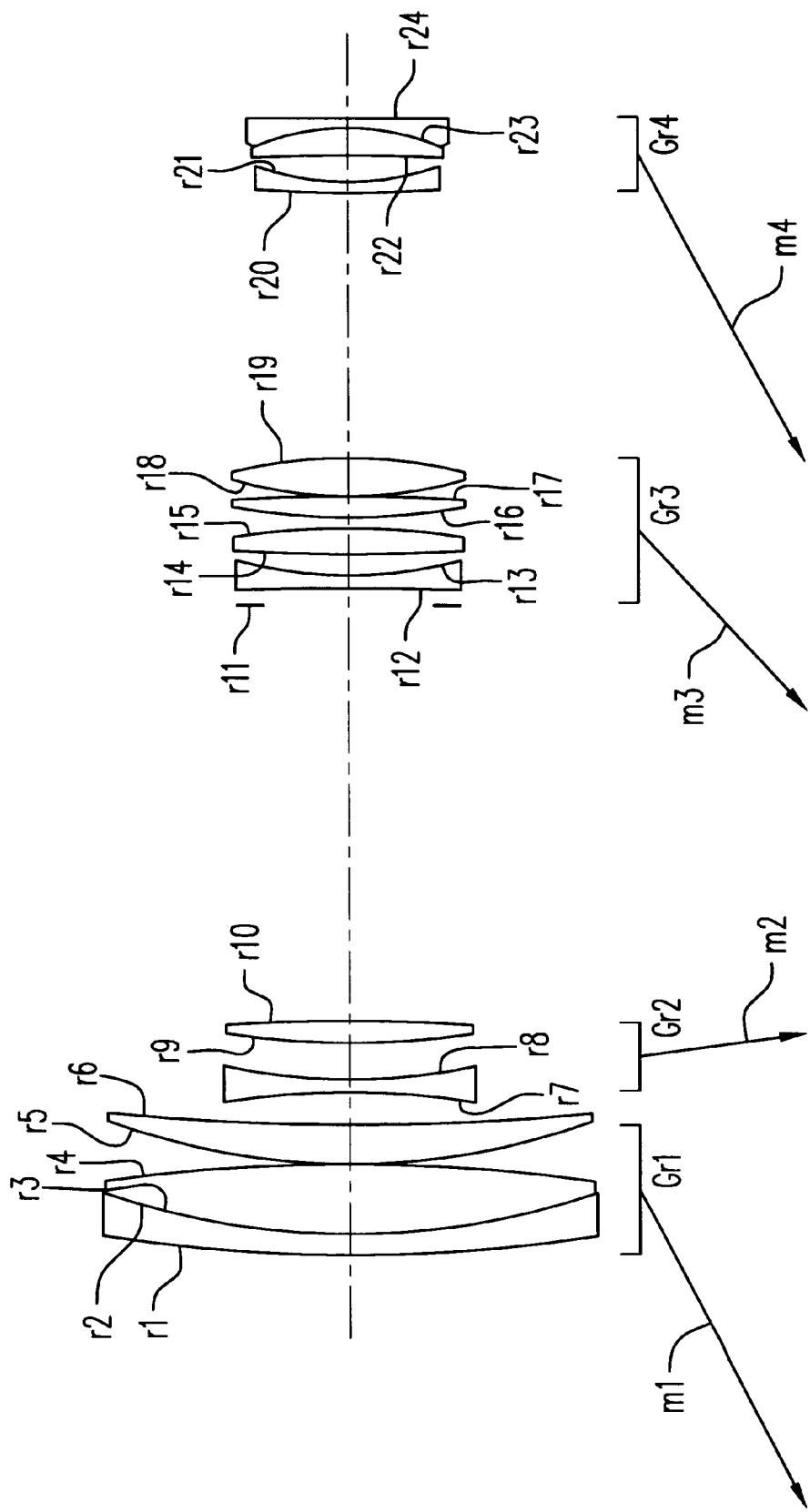
FIG. 2 is a drawing showing the lens construction of an optical system pertaining to a second embodiment.

Embodiments of the present invention are explained below with reference to the drawings. FIGS. 1 and 2 show the lens constructions of the optical systems of the first and second embodiments, respectively. They show the zoom lens system lens positions in the shortest focal length condition (wide end). The arrows m1 through m4 in these drawings indicate in a simplified fashion the movements of the first lens block Gr1 through the fourth lens block Gr4 from the wide end to the telephoto end (the longest focal length condition).

As in the embodiments, a very compact optical system may be attained by providing an optical system comprising multiple lenses that has a construction in which (1) the extent of curvature of field asymmetricity is detected regarding the off-axial light traveling in two or more directions from among the light rays that have passed through a part or all of said optical system, (2) the position of a lens block in the optical system comprising a single lens or multiple lenses is adjusted using a position adjusting means such that the curvature of field asymmetricity may be reduced to a minimum, and (3) the position-adjusted lens block is fixed before assembly. In the embodiments, a very compact optical system from which the curvature of field asymmetricity is eliminated and that performs well across the entire field may be realized by applying the curvature of field asymmetricity adjustment to any target optical system.

With regard to the directions in which off-axial light should be detected, where the configuration of the image formation field is long horizontally, two directions along the width of the field are sufficient, but where the format is close to square, such as in the case of a silver halide camera or digital camera, it is essential to detect light from four directions or more. While various detection principles are available, possible means include MTF detection by means of an autofocus module used for distance measurement in a camera or a PSD element, or detection of the maximum light amount by means of a CCD element. The result of the detection of the curvature of field asymmetricity and the lens position adjustment mechanism are linked to each other, such that a mechanism is required that will reduce the curvature of field asymmetricity to a minimum while providing mutual feedback regarding the other component's results.

Further, if the position-adjusted lens block meets the conditions set forth below with regard to its decentering error sensitivity, an optical system having better performance may be provided.

$$\left|\frac{K(axcm)}{K(dm)}\right| < 0.1 \tag{1}$$

$$0.01 < \left|\frac{K(dm)}{Y}\right| < 0.2 \tag{2}$$

where,

K(axcm) represents the axial coma that occurs at an axial incidence height of 0.7H when the position-adjusted lens block moves 0.1 mm perpendicular to the optical axis, H represents a distance from the optical axis to the full-aperture axial light, K(dm) represents the field of curvature asymmetricity that occurs at a 0.7Y image height when the position-adjusted lens block moves 0.1 mm perpendicular to the optical axis, and Y represents a diagonal length of the field/2 at image plane.

Where the axial coma error sensitivity of the position-adjusted lens block comprising a single lens or multiple lenses is high, even if the curvature of field asymmetricity is eliminated through the curvature of field asymmetricity adjustment, axial coma still remains. Therefore, it is necessary to reduce the axial coma error sensitivity of the position-adjusted lens block to the extent possible. In other words, where the upper limit of the conditions (1) is exceeded, the axial coma that remains after curvature of field asymmetricity adjustment increases and the desired axial performance cannot be achieved.

The order of the sensitivity regarding the curvature of field asymmetricity of the position-adjusted lens block is also important. In other words, if the curvature of field asymmetricity sensitivity is so small as to exceed the lower limit of the condition (2), the amount of movement of the lens(es) of the position-adjusted lens block increases during adjustment. As a result, it becomes essential to increase the amount of room between the outer diameter of the lens and the inner diameter of the lens mount, which leads to an increase in the diameter of the lens mount. Conversely, where the curvature of field asymmetricity sensitivity is so large as to exceed the upper limit of the condition (2), although the amount of movement of the lens(es) of the position-adjusted lens block decreases during adjustment, the deterioration in the curvature of field asymmetricity due to the erroneous positioning of the position-adjusted lens block increases, which leads to a reduction in off-axial performance.

The optical system described above is a zoom lens system, wherein the position-adjusted lens block moves independently of its neighboring lens blocks during zooming, and by adjusting the curvature of field asymmetricity between zoom blocks, good field performance may be achieved even in a very compact zoom optical system having a high decentering error sensitivity. In the zoom lens system, it is desired that the position-adjusted lens block satisfies the above-conditions (1) an d (2) at telephoto end.

In these embodiments, a very compact optical system may be attained by providing an optical system comprising multiple lenses that has a construction in which (1) the extent of axial coma is detected regarding the axial light from among the light rays that have passed through a part or all of the optical system comprising multiple lenses, (2) the position of a lens block in the optical system comprising a single lens or multiple lenses is adjusted using a position adjusting means such that the axial coma may be reduced to a minimum, and (3) the position-adjusted lens block is fixed before assembly. In the present invention, a very compact optical system from which the axial coma is eliminated and that has good axial performance in particular may be realized by applying the axial coma adjustment to any target optical system.

Furthermore, if the position-adjusted lens block meets the conditions set forth below with regard to its decentering error sensitivity, a zoom lens system having better performance may be provided.

$$\left|\frac{K(dm)}{K(axcm)}\right| < 3 \tag{3}$$

$$0.0003 < \left|\frac{K(axcm)}{Y}\right| < 0.02 \tag{4}$$

where,

K(axcm) represents the axial coma that occurs at an axial incidence height of 0.7H when the position-adjusted lens block moves 0.1 mm perpendicular to the optical axis.

H represents a distance from the optical axis to the full-aperture axial light,

K(dm) represents the field of curvature asymmetricity that occurs at a 0.7Y image height when the position-adjusted lens block moves 0.1 mm perpendicular to the optical axis, and Y represents a diagonal length of the field/2 at image plane.

Where the curvature of field asymmetricity sensitivity of the position-adjusted lens block comprising a single lens or multiple lenses is high, even if the axial coma is eliminated through the axial coma adjustment, curvature of field asymmetricity remains. Therefore, it is necessary to reduce the sensitivity of the position-adjusted lens block regarding the curvature of field asymmetricity to the extent possible. In other words, where the upper limit of the condition (3) is exceeded, the curvature of field asymmetricity that remains after axial coma adjustment increases and the desired field performance cannot be achieved.

The order of the sensitivity regarding the curvature of field asymmetricity of the position-adjusted lens block is also important. In other words, if the axial coma sensitivity is so small as to exceed the lower limit of the condition (4), the amount of movement of the lens(es) of the position-adjusted lens block increases during adjustment. As a result, it becomes essential to increase the amount of room between the outer diameter of the lens and the inner diameter of the lens mount, which leads to an increase in the size of the diameter of the lens mount. Conversely, where the axial coma sensitivity is so large as to exceed the upper limit of the condition (4), although the amount of movement of the lens(es) of the position-adjusted lens block decreases, the deterioration in the axial coma due to the erroneous positioning of the position-adjusted lens block increases, which leads to a reduction in axial performance.

The optical system described above is a zoom lens system, wherein the position-adjusted lens block moves independently of its neighboring lens blocks during zooming, and by adjusting the axial coma between zoom blocks, good axial performance may be achieved even for a very compact zoom optical system having a high decentering error sensitivity. In the zoom lens system, it is desired that the position-adjusted lens block satisfies the above-conditions (3) and (4) at telephoto end.

The present invention can also provide a very compact zoom lens system by using a construction for an optical system comprising multiple lenses in which (1) the extent of axial coma regarding the axial light is detected from among the light rays that have passed through a part or all of the optical system, (2) the position of a first lens block in said optical system, said lens block comprising a single lens or multiple lenses, is adjusted using a position adjusting means such that the axial coma is reduced to a minimum, and (3) after the first position-adjusted lens block is fixed, a second lens block comprising a single lens or multiple lenses is placed in the optical system assembly, wherein the extent of curvature of field asymmetricity is detected regarding the off-axial light in two directions or more from the light rays that have passed through the optical system containing the second lens block, (2) the position of the second lens block is adjusted using a position adjusting means such that the curvature of field asymmetricity may be reduced to a minimum, and (3) the second position-adjusted lens block is fixed during assembly.

As described above, because the decentering error sensitivity of each lens or lens block has been increasing as the optical systems become smaller, it is essential to eliminate the axial coma and curvature of field asymmetricity, which are the two major decentering aberrations, in order to achieve good optical system performance. For that purpose, it is effective to make adjustments with regard to both aberrations in an optical system having large error sensitivities.

The focus now becomes the second decentering aberration that remains after the first adjustment is made. Where the error sensitivity regarding curvature of field asymmetricity of a lens block comprising a single lens or multiple lenses that is moved in the first adjustment is high, even if the axial coma is eliminated in the first adjustment, curvature of field asymmetricity will remain. Therefore, a second adjustment will be made with regard to the curvature of field asymmetricity, but if the axial coma error sensitivity of the lens block comprising a single lens or multiple lenses that is moved during the second adjustment is high, axial coma will remain, and this phenomenon will continue to occur indefinitely. What is important here is to make the curvature of field asymmetricity error sensitivity of the lens block comprising a single lens or multiple lenses that is moved in the last adjustment (the second curvature of field asymmetricity adjustment here) become as close to zero as possible.

Let us now consider a lens shutter zoom lens system. In recent years, as the demand or higher zoom ratios in lens shutter zoom lens systems has increased, the desire for compactness has continued to increase as well. The problem that occurs when an optical system is made compact is generally that the decentering error sensitivity of the lens increases.

Now let us consider a zoom lens system having a zoom ratio of approximately 5× and comprising, from the object side, a positive first lens block, a positive second lens block, a positive third lens block and a negative fourth lens block, which performs zooming by changing the distances between the lens blocks. In such a zoom lens system, the decentering error sensitivity of each lens block becomes very high. Using the conventional assembly method incorporating no adjustment, it is clear that the desired performance cannot be achieved. Therefore, the adjustment method described above is effective.

Specifically, in the lens mount assembly process, the third lens block, the fourth lens block and the second lens block are first assembled in that order. The desired incident light is made to come from the front side of the second lens block and the detection system is located on the image plane side. The second lens block is moved perpendicularly to the optical axis to perform axial coma adjustment. Through this adjustment, the axial coma in the second, third and fourth lens blocks is eliminated. However, because the curvature of field asymmetricity sensitivity of the second lens block is high, the curvature of field asymmetricity of the second, third and fourth lens blocks will remain to a large extent if no further processing is done.

This remaining asymmetricity will be eliminated through the following adjustment. In other words, the desired incident light is made to come from the front side of the first lens block after the first lens block is assembled together with the second, third and fourth lens blocks, and the detection system is located on the image plane side. The first lens block is then moved perpendicularly to the optical axis to perform curvature of field asymmetricity adjustment. Through this adjustment, the curvature of field asymmetricity in the first, second third and fourth lens blocks is eliminated. Moreover, the axial coma sensitivity of the first lens block is so small that an optical system having good optical performance regarding both axial and off-axial light may be assembled without exacerbating the axial coma.

The construction of the optical system of each embodiment is shown more specifically below with reference to construction data. Embodiments 1 to 2 shown below correspond to the first and second embodiments, respectively. The lens construction drawings showing the first and second embodiments (FIGS. 1 and 2) show the lens constructions of the embodiments 1 and 2, respectively.

In each embodiment, $ri(i=1, 2, 3, \ldots)$ represents the radius of curvature of the ith lens surface from the object side; $di(i=1, 2, 3, \ldots)$ represents the ith axial distance from the object side; and $Ni(i=1, 2, 3, \ldots)$ and $vi(i=1, 2, 3, \ldots)$ represent the refractive index and the Abbe number with regard to the d-line of the ith lens from the object side, respectively. The focal length f of the entire system, F-number FNO and the distances that change during zooming (axial distances) in the shortest focal length condition (wide end), the middle focal length condition and the longest focal length condition (telephoto end) are shown in that order from the left. In each embodiment, the surface marked with an asterisk in the radius of curvature column is aspherical. The formula that expresses the surface configuration of an aspherical surface is defined below:

$$x(H) = \frac{c \cdot H^2}{1 + \sqrt{1 - \varepsilon \cdot c^2 \cdot H^2}} + \sum_{i \geq 2} A_i \cdot H^i$$

wherein

H represents a height in the direction perpendicular to the optical axis;

x(H) represents a deviation from the reference plane in the direction of the optical axis;

c represents a paraxial curvature; $\varepsilon$ represents quadric surface parameter; and Ai: ith aspherical surface coefficient.

The tables 2, 3, 5 and 6 are error sensitivity tables. AXCM in the tables represent the K(axcm) above and DM represents (K(dm)/2. Further, ST represents the standard position status where there is no decentering. Through the tables, the standard position status and the extent of each decentering aberration that occurs when each lens block is decentered by 0.1 mm in a direction perpendicular to the optical axis are known.

TABLE 1

<Embodiment 1>
f = 22.50 ~ 86.02 ~ 107.28
FNO = 5.90 ~ 10.00 ~ 10.10

| Radius of Curvature | Axial Distance | Refractive Index | Abbe Number |
|---|---|---|---|
| r1 = 25.821 | | | |
| | d1 = 3.512 | N1 = 1.48749 | v1 = 70.44 |
| r2 = −29.186 | | | |
| | d2 = 0.800 | N2 = 1.84666 | v2 = 23.82 |
| r3 = −108.165 | | | |
| | d3 = 0.975 ~ 9.492 ~ 10.744 | | |
| r4 = −34.769 | | | |
| | d4 = 0.800 | N3 = 1.85000 | v3 = 40.04 |
| r5 = 11.452 | | | |
| | d5 = 0.205 | | |
| r6 = 12.452 | | | |
| | d6 = 2.600 | N4 = 1.79850 | v4 = 22.60 |
| r7 = 62.752 | | | |
| | d7 = 0.800 | | |
| r8 = 11.949 | | | |
| | d8 = 2.595 | N5 = 1.48749 | v5 = 70.44 |
| r9 = −22.818 | | | |
| | d9 = 1.200 ~ 7.702 ~ 8.476 | | |
| r10 = (Diaphragm) | | | |
| | d10 = 3.319 | | |
| r11* = −5.595 | | | |
| | d11 = 0.900 | N6 = 1.58340 | v6 = 30.23 |
| r12* = −6.988 | | | |
| | d12 = 0.567 | | |
| r13 = −31.784 | | | |
| | d13 = 3.774 | N7 = 1.58913 | v7 = 61.11 |
| r14 = −7.300 | | | |
| | d14 = 8.076 ~ 1.575 ~ 0.800 | | |
| r15* = −8.013 | | | |
| | d15 = 1.600 | N8 = 1.75450 | v8 = 51.57 |
| r16* = ∞ | | | |

[Aspherical surface coefficient of the ninth surface (r9)]

$\varepsilon$ = 1.0000
A4 = 0.19747007 × 10$^{-4}$

TABLE 1-continued

<Embodiment 1>
f = 22.50 ~ 86.02 ~ 107.28
FNO = 5.90 ~ 10.00 ~ 10.10

A6 = 0.77154885 × 10$^{-6}$
A8 = −0.71781195 × 10$^{-7}$
A10 = 0.28879144 × 10$^{-8}$
A12 = −0.37463299 × 10$^{-10}$

[Aspherical surface coefficient of the eleventh surface (r11)]

$\varepsilon$ = 1.0000
A4 = −0.33596380 × 10$^{-4}$
A6 = 0.35145739 × 10$^{-6}$
A8 = −0.56353071 × 10$^{-7}$
A10 = 0.51675273 × 10$^{-8}$
A12 = −0.19104404 × 10$^{-10}$

[Aspherical surface coefficient of the twelfth surface (r12)]

$\varepsilon$ = 1.0000
A4 = 0.50181255 × 10$^{-3}$
A6 = 0.21558155 × 10$^{-8}$
A8 = −0.24511692 × 10$^{-4}$
A10 = 0.16685729 × 10$^{-5}$
A12 = −0.45918002 × 10$^{-7}$

[Aspherical surface coefficient of the fifth surface (r15)]

$\varepsilon$ = 0.5399
A4 = 0.73410280 × 10$^{-4}$
A6 = 0.40176103 × 10$^{-6}$
A8 = −0.22097144 × 10$^{-8}$
A10 = 0.10862653 × 10$^{-8}$
A12 = −0.86080466 × 10$^{-11}$

[Aspherical surface coefficient of tlie sixteenth surface (r16)]

$\varepsilon$ = 1.0000
A4 = −0.87283110 × 10$^{-4}$
A6 = 0.69193831 × 10$^{-7}$
A8 = 0.69984864 × 10$^{-8}$
A10 = −0.25989654 × 10$^{-10}$

TABLE 2

Error Sensitivity at telephoto end
Y = 12
0.1 mm Parallel decentering

| | AXCM | DM |
|---|---|---|
| ST | 0.0000 | 0.0773 |
| Gr1 | 0.0002 | 0.3526 |
| Gr2 | 0.0560 | −0.4443 |
| Gr3 | −0.0279 | −0.4251 |
| Gr4 | −0.0288 | 0.4633 |

TABLE 3

Error Sensitivity at wide-angle end
Y = 12
0.1 mm Parallel decentering

| | AXCM | DM |
|---|---|---|
| ST | 0.0000 | 0.0633 |
| Gr1 | −0.0004 | 0.0452 |
| Gr2 | 0.0023 | −0.0362 |
| Gr3 | 0.0013 | −0.1100 |
| Gr4 | −0.0013 | 0.0491 |

TABLE 4

<Embodiment 2>
f = 102.50 ~ 300.03 ~ 390.05
FNO = 4.60 ~ 5.80 ~ 6.90

| Radius of Curvature | Axial Distance | Refractive Index | Abbe Number |
|---|---|---|---|
| r1 = 188.993 | | | |
| | d1 = 2.500 | N1 = 1.85000 | ν1 = 40.04 |
| r2 = 88.006 | | | |
| | d2 = 0.100 | | |
| r3 = 88.006 | | | |
| | d3 = 8.000 | N2 = 1.49310 | ν2 = 83.58 |
| r4 = 210.439 | | | |
| | d4 = 0.200 | | |
| r5 = 79.791 | | | |
| | d5 = 4.600 | N3 = 1.48749 | ν3 = 70.44 |
| r6 = 276.325 | | | |
| | d6 = 4.000 ~ 65.989 ~ 83.232 | | |
| r7 = −84.282 | | | |
| | d7 = 1.400 | N4 = 1.71300 | ν4 = 53.93 |
| r8 = 65.658 | | | |
| | d8 = 4.350 | | |
| r9 = 86.940 | | | |
| | d9 = 2.400 | N5 = 1.75520 | ν5 = 27.51 |
| r10 = −352.847 | | | |
| | d10 = 50.550 ~ 11.047 ~ 2.001 | | |
| r11 = (Diaphragm) | | | |
| | d11 = 1.800 | | |
| r12 = −554.394 | | | |
| | d12 = 1.500 | N6 = 1.84666 | ν6 = 23.83 |
| r13 = 48.833 | | | |
| | d13 = 2.700 | | |
| r14 = 256.481 | | | |
| | d14 = 3.000 | N7 = 1.59270 | ν7 = 35.45 |
| r15 = −81.803 | | | |
| | d15 = 1.400 | | |
| r16 = 80.485 | | | |
| | d16 = 2.400 | N8 = 1.51680 | ν8 = 64.20 |
| r17 = −250.109 | | | |
| | d17 = 0.100 | | |
| r18 = 50.413 | | | |
| | d18 = 4.500 | N9 = 1.48749 | ν9 = 70.44 |
| r19 = −60.077 | | | |
| | d19 = 31.682 ~ 9.196 ~ 0.999 | | |
| r20 = 195.848 | | | |
| | d20 = 1.200 | N10 = 1.75450 | ν10 = 51.57 |
| r21 = 33.636 | | | |
| | d21 = 3.300 | | |
| r22 = −222.323 | | | |
| | d22 = 3.200 | N11 = 1.67339 | ν11 = 29.25 |
| r23 = −26.697 | | | |
| | d23 = 1.200 | N12 = 1.69680 | ν12 = 56.47 |
| r24 = 429.991 | | | |

TABLE 5

Error Sensitivity at telephoto end
Y = 12
0.1 mm Parallel decentering

| | AXCM | DM |
|---|---|---|
| ST | 0.0000 | 0.2734 |
| Gr1 | −0.0046 | 0.1110 |
| Gr2 | −0.0091 | −0.0240 |
| Gr3 | 0.0107 | −0.0662 |
| Gr4 | 0.0032 | −0.0215 |

TABLE 6

Error Sensitivity at wide-angle end
Y = 12
0.1 mm Parallel decentering

| | AXCM | DM |
|---|---|---|
| ST | 0.0000 | −0.0386 |
| Gr1 | −0.0001 | 0.0196 |
| Gr2 | −0.0035 | 0.1015 |
| Gr3 | 0.0038 | −0.2115 |
| Gr4 | 0.0005 | 0.0871 |

The table 7 shows values corresponding to the conditions (1) through (4) of the Embodiment 1 and 2.

TABLE 7

| | EMBODIMENT 1 | EMBODIMENT 2 |
|---|---|---|
| Condition (1) | 0.00056 (2nd lens unit) | — |
| Condition (2) | 0.0204 (2nd lens unit) | — |
| Condition (3) | — | 2.67 (2nd lens unit) |
| Condition (4) | — | 0.00053 (2nd lens unit) |

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical system comprising:
a plurality of lens elements; and
a lens block constituting one or more lens elements in the optical system,
wherein an extent of curvature of field asymmetricity in two or more directions is detected by using an off-axial rays that have passed through the lens block and wherein a position of the lens block is adjusted such that the curvature of field asymmetricity is reduced to a minimum,
wherein the lens block fulfills the following conditions:

$$\left|\frac{K(axcm)}{K(dm)}\right| < 0.1$$

$$0.01 < \left|\frac{K(dm)}{Y}\right| < 0.2$$

where,

K(axcm) represents the axial coma that occurs at an axial incidence height of 0.7H when the lens block moves 0.1 mm perpendicular to the optical axis, H represents a distance from the optical axis to the full-aperture axial light, K(dm) represents the field of curvature asymmetricity that occurs at a 0.7Y image height when the lens block moves 0.1 mm perpendicular to the optical axis, and Y represents a diagonal length of the field/2 at image plane.

2. An optical system as claimed in claim 1, wherein the optical system is a zoom lens system, and wherein the lens block moves independently of its neighboring lens blocks during zooming.

3. An optical system comprising:
a plurality of lens elements; and
a lens block constituting one or more lens elements in the optical system,
wherein an extent of axial coma in two or more directions is detected by using an off-axial rays that have passed through the lens block and wherein a position of the lens block is adjusted such that the axial coma is reduced to a minimum, wherein the lens block fulfills the following conditions:

$$\left|\frac{K(dm)}{K(axcm)}\right| < 3$$

$$0.0003 < \left|\frac{K(axcm)}{Y}\right| < 0.02$$

where,

K(axcm) represents the axial coma that occurs at an axial incidence height of 0.7H when the lens block moves 0.1 mm perpendicular to the optical axis, H represents a distance from the optical axis to the full-aperture axial light, K(dm) represents the field of curvature asymmetricity that occurs at a 0.7Y image height when the lens block moves 0.1 mm perpendicular to the optical axis, and Y represents a diagonal length of the field/2 at image plane.

4. An optical system as claimed in claim 3, wherein the optical system is a zoom lens system, and wherein the lens block moves independently of its neighboring lens blocks during zooming.

5. An assembling method of an optical system comprising steps of:

detecting an extent of curvature of field asymmetricity in two or more directions by using an off-axial rays that have passed through a lens block constituting one or more lens elements in the optical system;

adjusting a position of the lens block such that the curvature of field asymmetricity is reduced to a minimum, the lens block being satisfied with the following conditions:

$$\left|\frac{K(axcm)}{K(dm)}\right| < 0.1$$

$$0.01 < \left|\frac{K(dm)}{Y}\right| < 0.2$$

where,

K(axcm) represents the axial coma that occurs at an axial incidence height of 0.7H when the lens block moves 0.1 mm perpendicular to the optical axis, H represents a distance from the optical axis to the full-aperture axial light, K(dm) represents the field of curvature asymmetricity that occurs at a 0.7Y image height when the lens block moves 0.1 mm perpendicular to the optical axis, and Y represents a diagonal length of the field/2 at image plane; and fixing the lens block.

6. An assembling method of an optical system as claimed in claim 5, wherein the optical system is a zoom lens system, and wherein the lens block moves independently of its neighboring lens blocks during zooming.

7. An assembling method of an optical system comprising steps of:

detecting an extent of axial coma in two or more directions by using an axial rays that have passed through a lens block constituting one or more lens elements in the optical system;

adjusting a position of the lens block such that the axial coma is reduced to a minimum, the lens block being satisfied with the following conditions:

$$\left|\frac{K(dm)}{K(axcm)}\right| < 3$$

$$0.0003 < \left|\frac{K(axcm)}{Y}\right| < 0.02$$

where,

K(axcm) represents the axial coma that occurs at an axial incidence height of 0.7H when the lens block moves 0.1 mm perpendicular to the optical axis, H represents a distance from the optical axis to the full-aperture axial light, K(dm) represents the field of curvature asymmetricity that occurs at a 0.7Y image height when the lens block moves 0.1 mm perpendicular to the optical axis, and Y represents a diagonal length of the field/2 at image plane; and fixing the lens block.

8. An assembling method of an optical system as claimed in claim 7, wherein the optical system is a zoom lens system, and wherein the lens block moves independently of its neighboring lens blocks during zooming.

9. An assembling method of an optical system comprising steps of:

detecting an extent of curvature of field asymmetricity in two or more directions by using an off-axial rays that have passed through a first lens block constituting one or more lens elements in the optical system;

adjusting a position of the lens block such that the curvature of field asymmetricity is reduced to a minimum, the first lens block being satisfied with the following conditions:

$$\left|\frac{K(axcm)}{K(dm)}\right| < 0.1$$

$$0.01 < \left|\frac{K(dm)}{Y}\right| < 0.2$$

where,

K(axcm) represents the axial coma that occurs at an axial incidence height of 0.7H when the first lens block moves 0.1 mm perpendicular to the optical axis, H represents a distance from the optical axis to the full-aperture axial light, K(dm) represents the field of curvature asymmetricity that occurs at a 0.7Y image height when the first lens block moves 0.1 mm perpendicular to the optical axis, and Y represents a diagonal length of the field/2 at image plane;

fixing the first lens block, detecting an extent of axial coma in two or more directions by using an axial rays that have passed through the first and a second lens block constituting one or more lens elements in the optical system;

adjusting a position of the second lens block such that the axial coma is reduced to a minimum, the second lens block being satisfied with the following conditions:

$$\left|\frac{K(dm)}{K(axcm)}\right| < 3$$

$$0.0003 < \left|\frac{K(axcm)}{Y}\right| < 0.02$$

where,

K(axcm) represents the axial coma that occurs at an axial incidence height of 0.7H when the second lens block moves 0.1 mm perpendicular to the optical axis, H represents a distance from the optical axis to the full-aperture axial light, K(dm) represents the field of curvature asymmetricity that occurs at a 0.7Y image height when the second lens block moves 0.1 mm perpendicular to the optical axis, and Y represents a diagonal length of the field/2 at image plane; and fixing the second lens block.

10. An assembling method of an optical system as claimed in claim 9, wherein the optical system is a zoom lens system, and wherein the first lens block moves independently of its neighboring lens blocks during zooming.

11. An assembling method of an optical system as claimed in claim 9, wherein the optical system is a zoom lens system, and wherein the second lens block moves independently of its neighboring lens blocks during zooming.

* * * * *